United States Patent
Nishizawa et al.

[11] Patent Number: 5,293,255
[45] Date of Patent: Mar. 8, 1994

[54] METHOD AND SYSTEM FOR EXTRACTING A SPECIFIC IMAGE

[75] Inventors: Akihito Nishizawa, Yokosuka; Takuya Imaide, Yokohama; Mayuko Yamamoto, Fujisawa, all of Japan

[73] Assignee: Hitachi, Ltd., Tokyo, Japan

[21] Appl. No.: 798,892

[22] Filed: Nov. 27, 1991

[30] Foreign Application Priority Data

Nov. 29, 1990 [JP] Japan ................. 2-325643

[51] Int. Cl.⁵ .......................................... H04N 1/387
[52] U.S. Cl. ....................................... 358/453; 358/452
[58] Field of Search ................ 358/452–453, 358/224, 227, 125–126

[56] References Cited

U.S. PATENT DOCUMENTS

| | | | |
|---|---|---|---|
| 4,403,256 | 9/1993 | Green et al. | 358/126 |
| 4,871,906 | 10/1989 | Ueda et al. | 358/227 |
| 4,965,678 | 10/1990 | Yamada | 358/452 |
| 5,063,606 | 11/1991 | Takamori | 358/453 |

Primary Examiner—Stephen Brinich
Attorney, Agent, or Firm—Antonelli, Terry, Stout & Kraus

[57] ABSTRACT

The present invention provides for designation of a prescribed area within an image as an initial extracting area, extraction of an area which fulfills the conditions determined according to the characteristics of the specific image from an image signal of an image, generation of comparative area signal presenting an area slightly larger than the extracted area which is necessary for fulfilling the conditions from the area extracting signal of the designated initial extracting area, comparison of the comparative area signal that has been generated with the candidate area signal through which the initial extracting signal of the initial extracting area is converted into an area extracting signal, and extraction of an image signal within the area determined by the new area extracting signal. As a result, the image which fulfills the conditions other than the specific image is eliminated as the extracted area that has been set as an initial extracting area changes to coincide with the specific image and only the object image which fulfills the conditions is extracted. Furthermore, since the area extracting signal is stored in a memory and used for generation of the next area extracting signal, the extracted area will follow the changes in image area owing to increase in size or movement of a specific object, thereby making it possible to extract a specific image in realtime.

19 Claims, 7 Drawing Sheets (a) 
(b) 
(c) 
(f) 
(g) 
(h) 
(d) 
(e)

METHOD AND SYSTEM FOR EXTRACTING A SPECIFIC IMAGE

BACKGROUND OF THE INVENTION

1. Field of the Invention

The present invention relates to a signal processing of image signal, particularly the method and system for extracting a specific image from an image screen.

2. Description of the Prior Art

Among the conventional technology for extracting only the image of a specific object from an image signal, that which has the background image stored once in the memory and extracts candidate area from the difference between the content of this memory and the input image to select and extract the area of a specific object according to distance information from three-dimensional vision, as described on p. 225-226 of Collection of Lecture Manuscripts from the 1990 Television Society National Convention, is known, for instance.

In the foregoing conventional technology, it was difficult to select and extract an image area of a specific object in realtime from a video signal that contains a background image taken by camcorders and an image of a specific object as it was necessary to have the background image recorded in the memory through some means.

SUMMARY OF THE INVENTION

An object of the present invention is to provide a method and system of extracting a specific image that solves such problem and makes it possible to extract in realtime and in a reliable manner a specific image from an image screen.

The features of the present invention for achieving this object include: designating a prescribed area inside an image as initial extracting area; memorizing the area extraction signal which is obtained through that designation; extracting from the image signal of the foregoing image an area which satisfies the conditions that are determined by the characteristics of the foregoing specific image and turn it into a candidate area signal; generating a comparative area signal presenting an area slightly larger than the foregoing extracting area, which is necessary for expanding the extracting area, from the area extracting signal of the stored initial extracting area mentioned above; comparing that comparative area signal that has been generated with the foregoing candidate area signal; turning that candidate area signal in that comparative area signal into a new area extracting signal; rewriting the area extracting signal in the foregoing initial extracting area by using the foregoing new area extracting signal; and performing either the extraction or removal of the foregoing image signal inside the area which is determined by the foregoing new area extraction signal.

For instance, it stores the area where the image of a specific object on an image screen is displayed in advance, extracts the portion which fulfills the conditions determined by the specific object in the video signal to compare it with the area which has been slightlyexpanded from the area stored in the memory, detects the foregoing portion included in this area and turns it into an extracted area of that video signal and stores in the memory so that it can be used in the next comparison. A processing similar to the above will be repeated thereafter based on this stored extracted area. As a result, the present invention possesses the following functions.

The portion of video signal which satisfies the conditions determined by a specific object is not always an image portion of a specific object. Meanwhile, an image of a specific object to be extracted is generally set at a specific position such as the center of image screen. Then, as an initial extracted area is first set at the memory, extracted area can be matched with this image through area extracting signal for extracting an image of a specific object from a video signal by setting this initial extracting area to come to this specific position of an image screen, while the image portion that satisfies the foregoing conditions other than the image of a specific object is eliminated through this area extracting signal.

Moreover, as the area extracting signal that has been obtained in the foregoing manner is stored in the memory and used for generation of the next area extracting signal, the extracted area will follow the changes in image area owing to increase in size or movement of a specific object, thereby accurately extracting an image of a specific object while making it possible to extract in realtime.

The foregoing and other objects, advantages, manner of operation and novel features of the present invention will be understood from the following detailed description when read in connection with the accompanying drawings.

DETAILED DESCRIPTION OF THE PREFERRED EMBODIMENT

Figure 1:
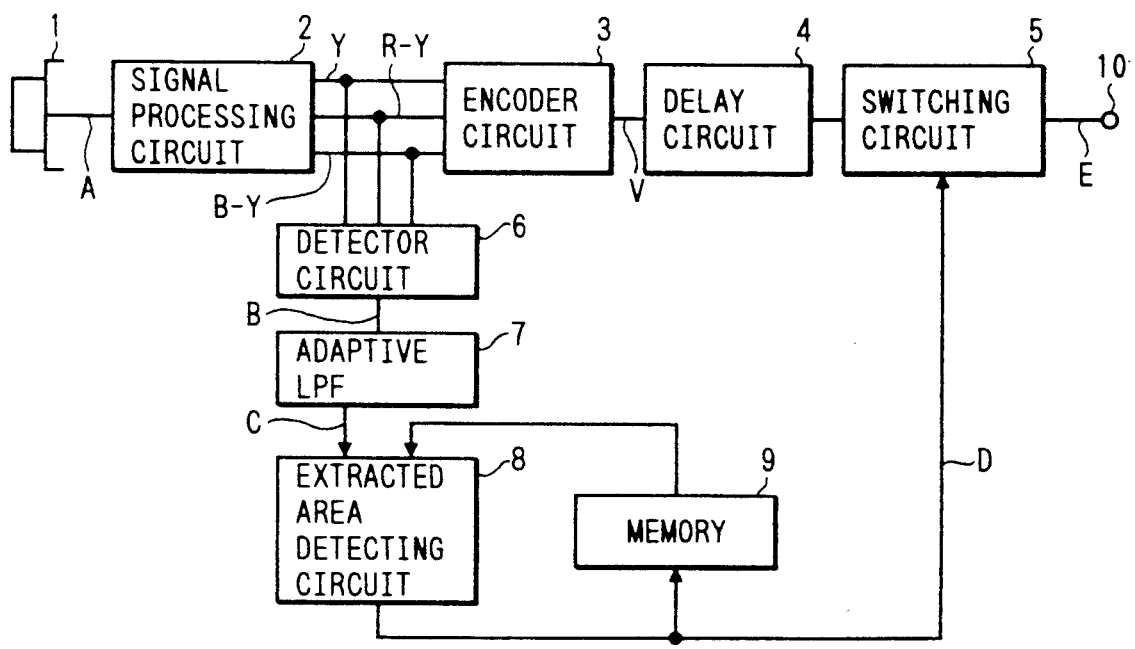
FIG. 1 is a block diagram presenting an embodiment of extraction method for a specific image according to the present invention.

Embodiments of the present invention is explained below with reference to the diagrams. FIG. 1 is a block diagram showing an embodiment of extraction method for a specific image as a specific image according to the present invention, with 1 corresponding to an image sensor, 2 to a signal processing circuit, 3 to an encoder circuit, 4 to a delay circuit, 5 to a switching circuit, 6 to a detector circuit, 7 to an adaptive LPF (low pass filter), 8 to an extracted area detecting circuit, 9 to a memory and 10 to an output terminal.

Figure 2:
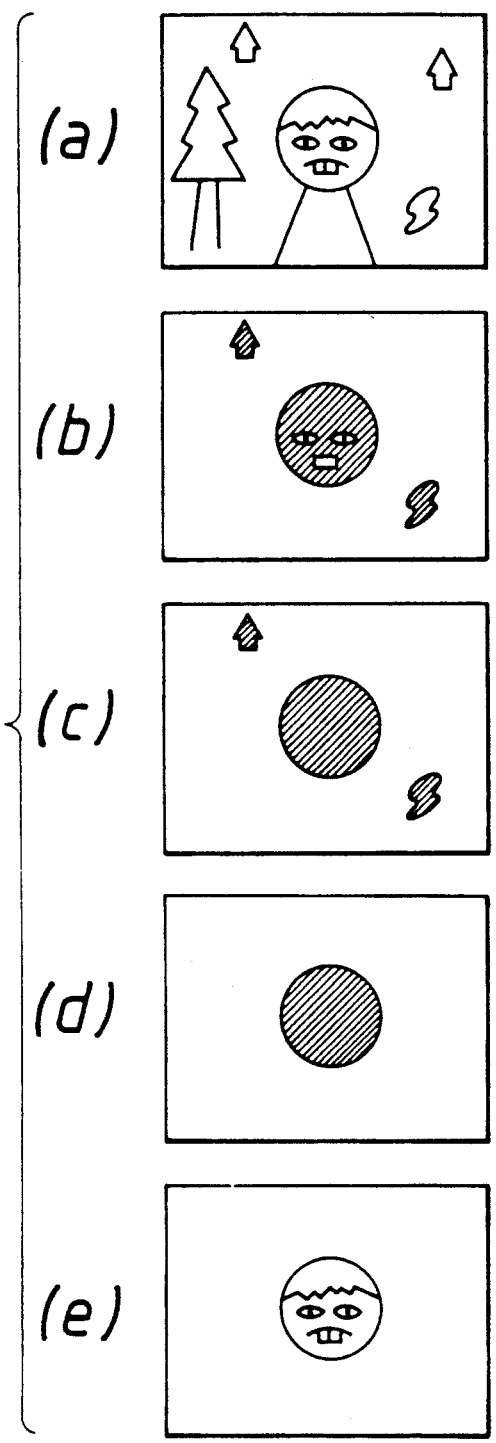
FIG. 2 (a) through (e) are explanation diagrams showing the motion of this embodiment.

In this diagram, signal A (FIG. 1) can be obtained from an image sensor 1 against the picture image shown in FIG. 2 (a). This signal A is processed at a signal processing circuit 2, generating luminance signal Y and two color difference signals R-Y and B-Y. These luminance signal Y and color difference signals R-Y and B-Y are supplied to an encoder circuit 3 to generate a color video signal V.

A luminance signal Y and color difference signals R-Y and B-Y that are output from a signal processing circuit 2 are supplied to a detector circuit 6, extracting a signal component which expresses, for instance, a skin color portion and a hair portion shown in FIG. 2 (b) of the subject image in FIG. (a). This signal component B turns into signal C of an image with little noise as shown in FIG. 2 (c) after its noise component is removed at an adaptive LPF 7. The image portion expressed by this signal C is referred to as a candidate area and this signal C is called a candidate area signal.

Figure 3:
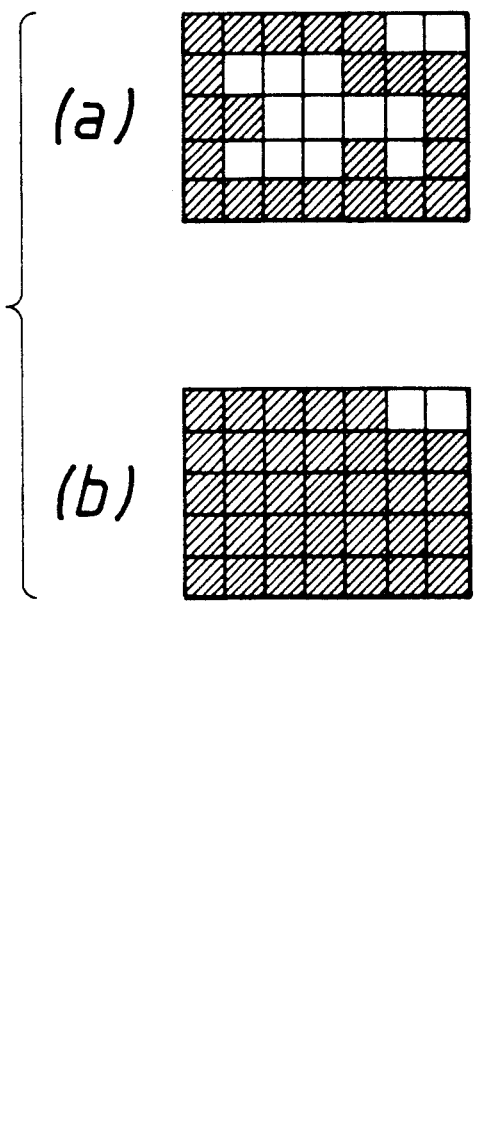
FIG. 3 (a) and (b) are explanation diagrams showing the motion of adaptive low pass filter.

Adaptive LPF 7 performs judgment processing for each pixel of an output signal B from a detector circuit 6, making a pixel which is subject to this processing into a pixel for necessary signal information even if it does not assume the form of necessary signal information as long as it is inside the area surrounded by pixels which comprise necessary signal information. In FIG. 3 (a), for instance, assuming that each pixel with hatching is a pixel for the human head in FIG. 2 (a) at a detector circuit 6 and that pixels without hatching are not pixels for the head in a detector circuit 6, pixels without hatching that are surrounded by areas of each pixel with hatching are pixels that were not extracted by noise despite the fact that they were pixels for the head in reality. Adaptive LPF 7 judges these pixels without hatching to be necessary pixels as they are surrounded by an area of each pixel with hatching and turns them into necessary pixels with hatching that comprise the human head as shown in FIG. 3(b).

Candidate area signal C which is output from adaptive LPF 7 is supplied to an extracted area detecting circuit 8 and put through comparison processing along with area extracting signal from a memory 9. A memory 9 possesses a capacity of 1 frame or 1 field and has an address set up corresponding to each pixel on the screen in FIG. 2 (a). Then pixel information is read out from an address of a memory 9 which corresponds to pixels at candidate area signal C from adaptive LPF 7. An initial area extracting signal presenting a specific area of image screen is stored at a memory 9 at first to compare this initial area extracting signal with a candidate area signal output from adaptive LPF 7. Such comparison processes an initial area extracting signal and generates a signal presenting a slightly broader area than the area on an image screen which it presents to extract candidate area signal C contained in this signal. According to this method, signal D of an image in FIG. 2 (d) which contains only an image of the head section can be obtained from an image shown in FIG. 2 (c) by setting an initial extracting signal at the center of image screen as the head, to which attention is given as specific object, is positioned at the center of an image screen. .This signal D is not only supplied to a switching circuit 5 as area extracting signal but written at a memory 9 in place of initial area extracting signal. In the next field or frame, this newly written area extracting signal is supplied to an extracted area detecting circuit 8 along with an output signal C of adaptive LPF, and a new extracted area signal D is generated in the same manner as mentioned above and supplied to a memory 9 and switching circuit 5.

Meanwhile, a color video signal V which is output from an encoder 3 is supplied to switching circuit 5 after being delayed at a delay circuit 4 to have a signal period portion of area extracting signal D extracted. The delay time at a delay circuit 4 is set equal to the time obtained by subtracting the delay time at an encoder circuit 3 from the sum of each delay time at a detector circuit 6, an adaptive LPF 7 and an extracted area detecting circuit 8. As a result, a signal E which is obtained at an output terminal 10 from a switching circuit 5 will be a signal which presents the human head section of the picture image in FIG. 2 (a).

As shown in the foregoing, a desired area of a subject image in an image sensor 1 is put thorough realtime extraction processing, with its delay time limited only to the sum of time required for processing by a detector circuit 6, an adaptive LPF 7 and an extracted area detecting circuit 8.

In addition, a memory with considerably small capacity can be used for a memory 9 because it does not have to store pixel information as it is and all that is required from it is to store about twice as many bits as the number of pixels on an image screen at an image sensor 1.

Furthermore, although there are also images other than a specific object (head) that satisfy the conditions determined by a specific object [FIG. 2 (b)], an extracted candidate area will be selected at the center of a screen where interest is high as an undesired candidate area at the edge of a screen is deleted by setting an initial extracting area, which is set at a memory 9, at the center of an image screen since an image of a specific object is generally positioned at the center of an image screen, while a desired section can be extracted without fail as extracted area will follow changes in size or movement of extracted candidate area because an area extracting signal D that has been obtained is stored in a memory 9 and is used for generating the next area extracting signal D.

Figure 4:
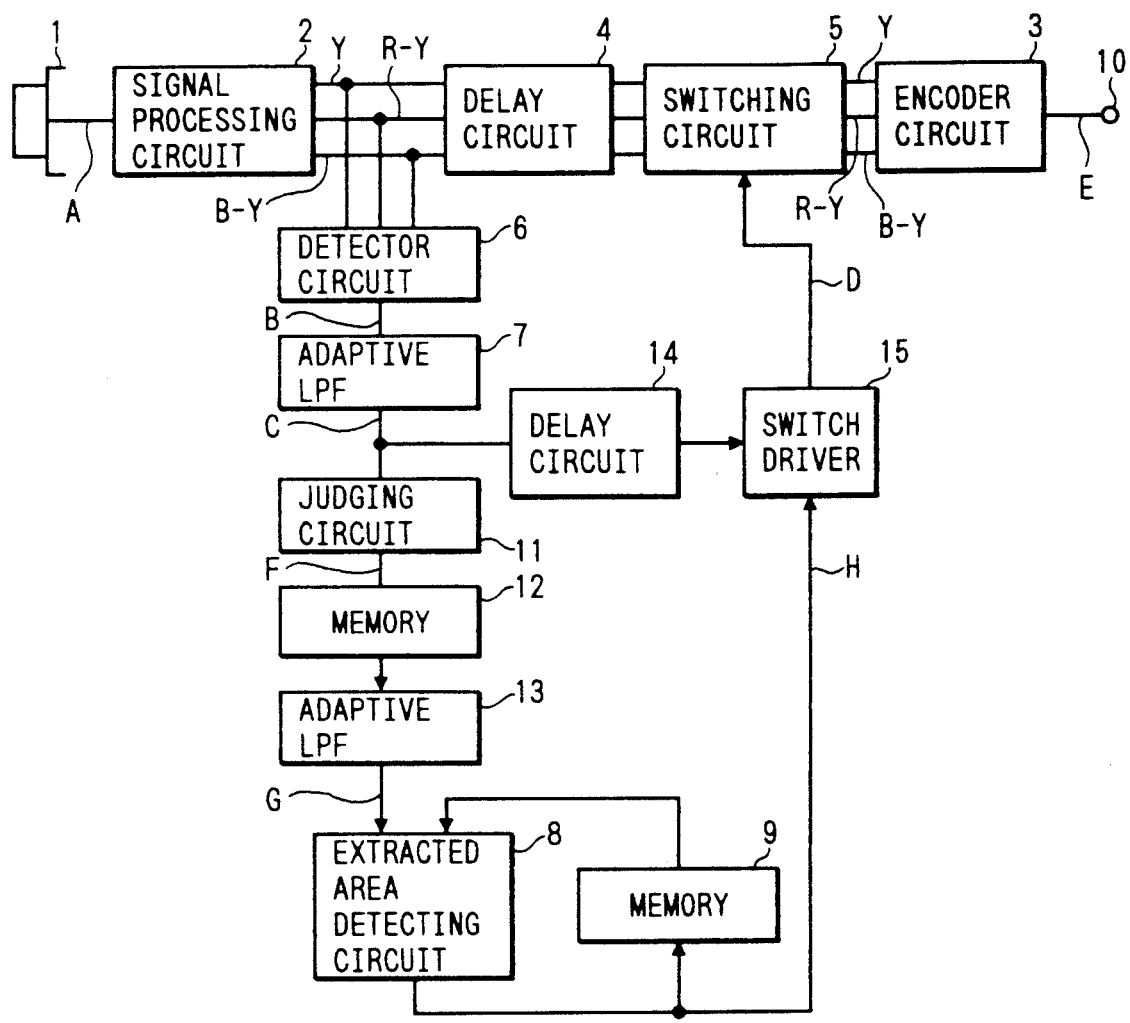
FIG. 4 is a block diagram showing another embodiment of extraction method for specific images according to the show invention.

FIG. 4 is a block diagram showing other embodiments of extraction method for specific objects according to the show invention, with 11 corresponding to a judging circuit, 12 to a memory, 13 to an adaptive LPF, 14 to a delay circuit and 15 to a switch driver circuit. The portion which corresponds to FIG. 1 will have an identity code to omit overlapping explanation.

Figure 5:
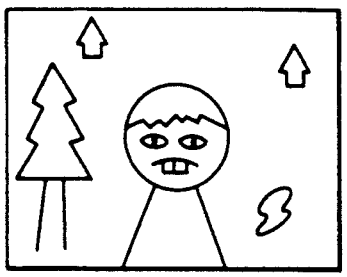
FIG. 5 (a) through (h) are explanation diagrams showing the motion of these embodiments.
Figure 5:
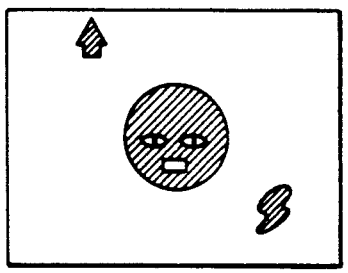
Figure 5:
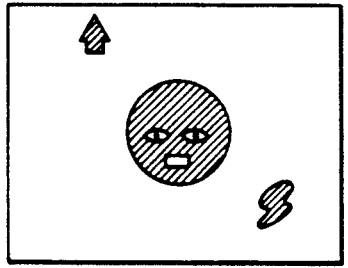
Figure 5:
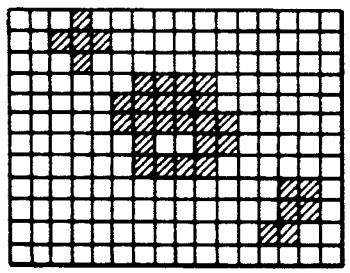
Figure 5:
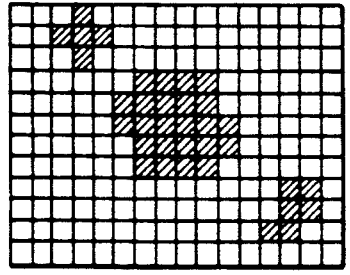
Figure 5:
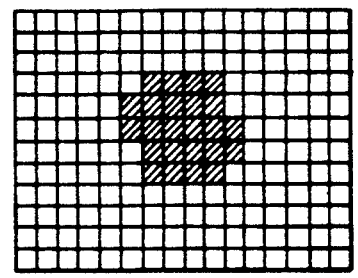
Figure 5:
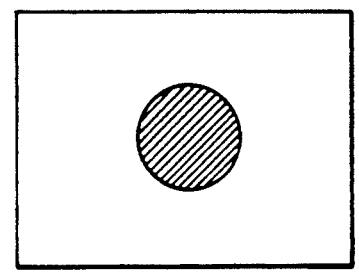
Figure 5:
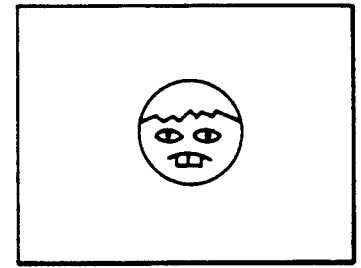

In addition, FIG. 5 shows the content of information presented by signals from each section in FIG. 4, with images in FIG. 5 (a), (b), (c), (d) and (e) each corresponding to signals A, B, C, D and E in FIG. 4 in the same manner FIG. 2 corresponds to FIG. 1.

In FIG. 4, an output signal C from an adaptive LPF 7 is supplied to a judging circuit 11. At a judging circuit 11, an image shown in FIG. 5 (c) is divided in a two dimensional area and existence of head area is judged for each area to generate signal F of an image shown in FIG. 5 (f). This signal F is first stored in a memory 12. Signal F read-out from a memory 12 is supplied to an adaptive LPF 13. At this adaptive LPF 13, a processing which converts an area without hatching surrounded by a candidate area including a head area which is shown with hatching in an image in FIG. 5 (f) into a candidate area including a head area, generating a signal G which shows the image shown in FIG. 5 (g). In this processing, white portions such as teeth and eye will become a candidate area as well. A processing similar to an embodiment shown in FIG. 1 will be performed on an output signal G of an adaptive LPF 13 by an extracted area detecting circuit 8 and a memory 9. An image presented by an output signal H of an extracted area detecting circuit 8 is shown in FIG. 5 (h).

An output signal H of an extracted area detecting circuit 8 is delayed at a delay circuit 14 and supplied to a switch drive circuit 15 along with an output signal C of an adaptive LPF 7. A switch drive circuit 15 generates from this (FIG. 5 (d)) an area extracting signal D, which is an area touching a non-extracted area of an extracted area with hatching in FIG. 5 (h) that responded to signal C from an adaptive LPF while other areas are those that responded to output signal H from an extracted area detecting circuit 8.

A switch circuit 5 extracts through an area extracting signal D a luminance signal Y and color difference signals R-Y and B-Y, both supplied via a delay circuit 4 from a signal processing circuit 2. Each output signal from a switch circuit 5 is processed at an encoder circuit 3 and becomes a video signal E. This video signal E will become an image presenting only the head section of an image in FIG. 5 (a), as shown in FIG. (e).

In addition, a delay time at a delay circuit 14 is set equal to the delay time from a judging circuit 11 to extracted area determining circuit 8, while a delay time for a delay circuit 4 is set equal to the delay time from a detector circuit 6 through a memory 12 up to a switch drive circuit 15.

An effect similar to that of an embodiment shown in FIG. 1 can be obtained in this embodiment.

Figure 6:
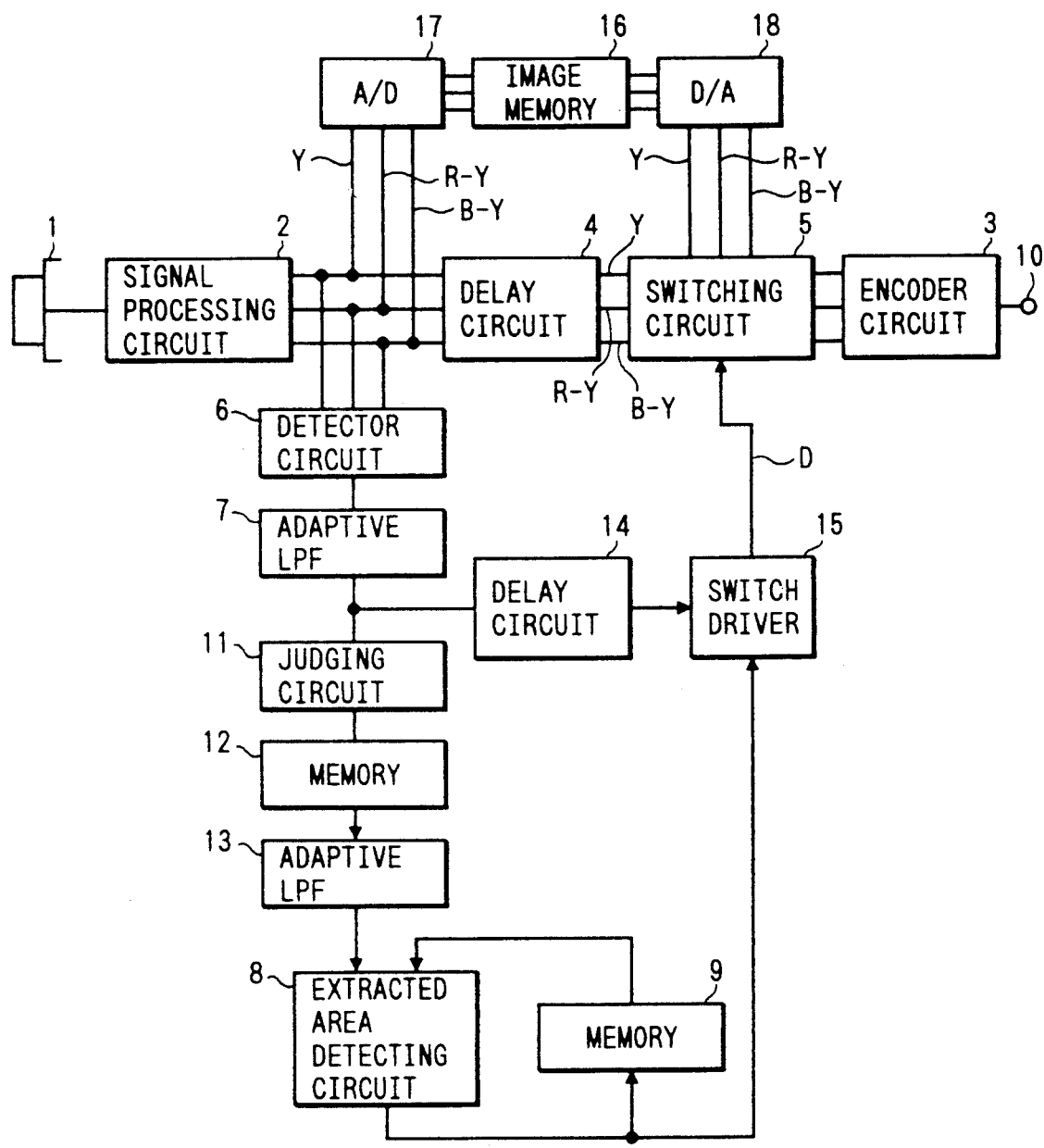
FIG. 6 and FIG. 7 are both block diagrams showing still another embodiments of extraction method for specific images according to the present invention.

In FIG. 6, an image memory 16, an A/D converter 17 and a D/A converter 18 have been added to an embodiment shown in FIG. 4, and among those capable of integrating an image extracted by an area extracting signal D at a switching circuit 5 to an image stored in this image memory, it provides a similar effect as that of an embodiment shown in FIG. 4.

Figure 7:
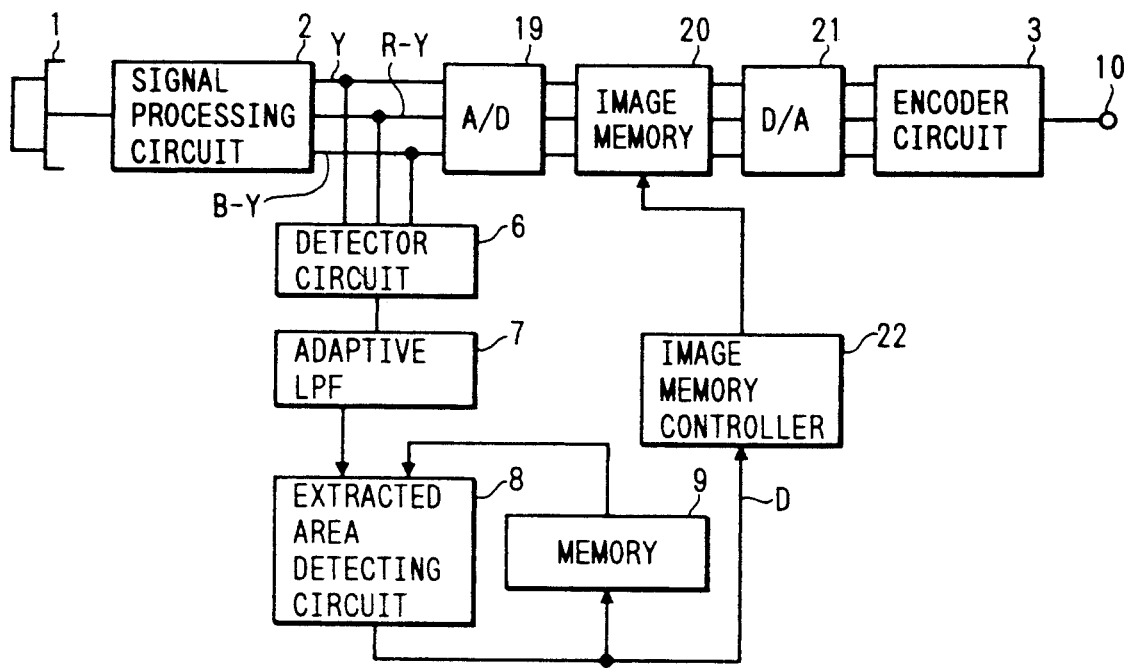

FIG. 7 is a block diagram showing still another embodiment of extraction method for specific images according to the present invention, with 19 corresponding to an A/D converter, 20 to an image memory, 21 to a D/A converter and 22 to an image memory control circuit. The portion which corresponds to FIG. 1 will have an identity code to omit overlapping explanation.

In this figure, a luminance signal Y and color difference signals R-Y and B-Y that are output from a signal processing circuit 2 are each digitized at A/D converter 19 and written into an image memory 20. An image memory controller 22 preforms a read-out of an image memory 20 so that an area of a picture image to be extracted will be displayed in magnification (zoom-up) at a fixed position such as the center of a screen by an area extracting signal D from an extracted area detecting circuit 4. A luminance signal Y and color difference signals R-Y and B-Y that are read out from an image memory 20 are each analogized at a D/A converter 21 and supplied to an encoder circuit 3 to generate a color video signal E.

Figure 8A:
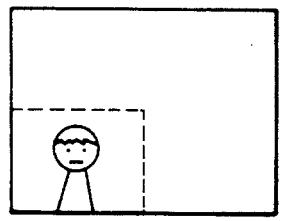
FIG. 8 (a) through (c) are explanation diagrams showing a reading motion of image memory in FIG. 7.
Figure 8C:
Figure 8B:
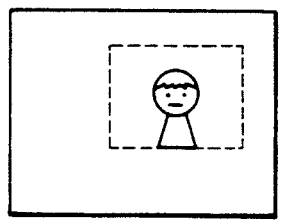

Zoom-up can be performed by making the size of a readout area at an image memory 20 smaller than the entire write-in area of this image memory 20, and this read-out area is set by an image memory controller 22 so that an extracted area determined by an area extracting signal D will be at a fixed position of this read-out area. Accordingly, assuming the human head to be an extracted area, an area shown in dashed line as shown in FIG. 8 (a) will be the read-out area of an image memory 20 if this head section is at the lower left portion of the entire screen, while an area shown in dashed line as shown in FIG. 8 (b) will be the read-out area of an image memory 20 if this head section is slightly off to the right from the center of the entire screen. In either case, an image from signal E which is obtained at an output terminal 10 will have the are shown in dashed line enlarged to produce an image shown in FIG. 8 (c).

Thus, according to this embodiment, a desired section of an image screen is extracted and displayed at a fixed position on the screen, which means that an effect which is essentially similar to the foregoing embodiment can be obtained.

Figure 9:
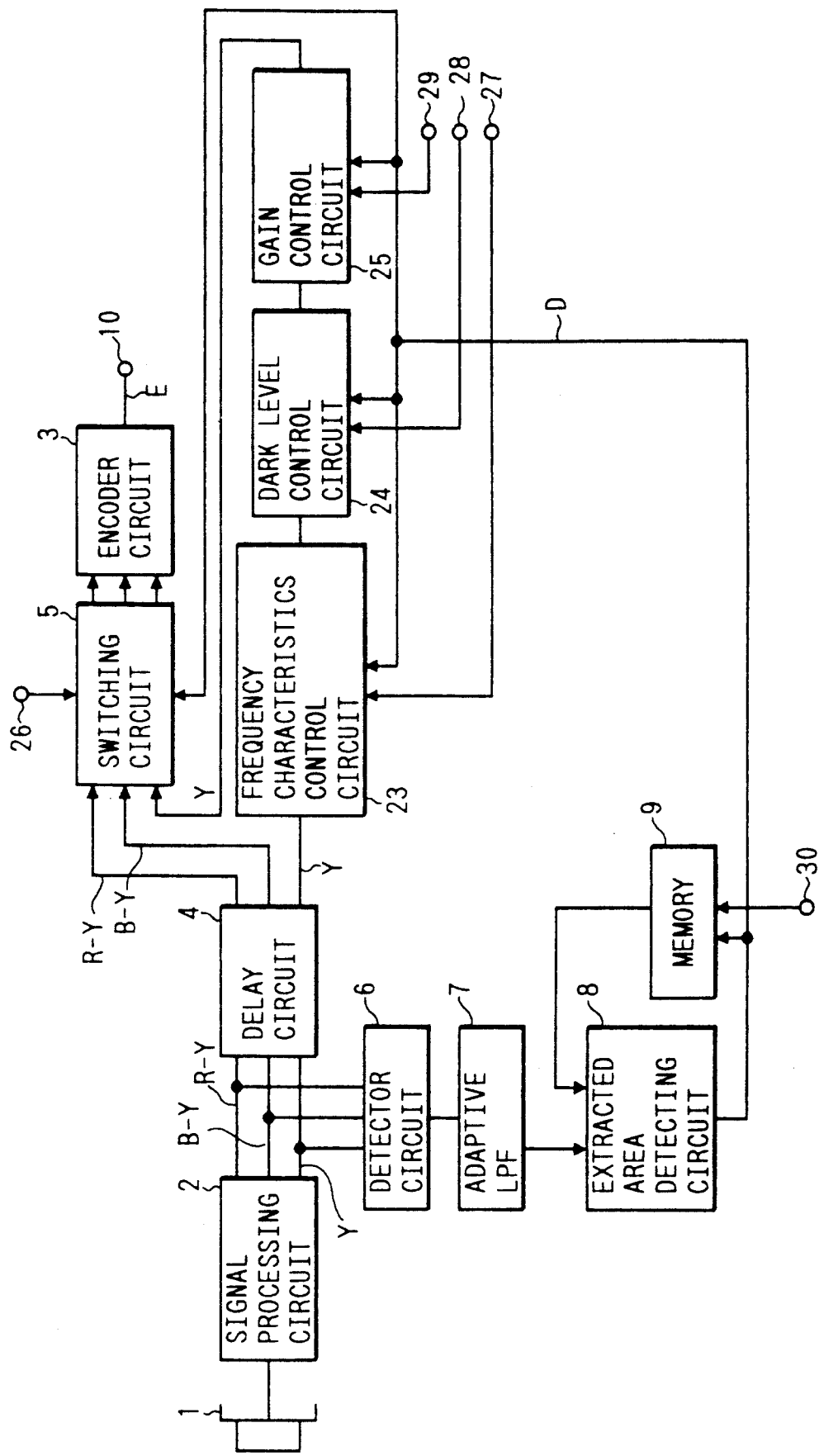
FIG. 9 is a block diagram showing a still another embodiment of extraction method for a specific image according to the present invention.

FIG. 9 is a block diagram showing still another embodiment of extraction method for a specific object according to the present invention, with 24 corresponding to a dark level control circuit, 25 to gain control circuit, 26 through 30 to input terminals. The portion which corresponds to FIG. 1 will have an identity code to omit overlapping explanation.

In this figure, a luminance signal Y and color difference signals R-Y and B-Y that are output from a signal processing circuit 2 are each delayed at a delay circuit 4, of which color difference signals R-Y and B-Y are supplied directly to a switching circuit 5, while a luminance signal Y is supplied to a switching circuit 5 after being processed successively at a frequency characteristics control circuit 23, whose characteristics are controlled by an area extracting signal D which is output from an extracted area detecting circuit 8, and at a dark level control circuit 24 and a gain control circuit 25. At a switching circuit 5, the signal period portion of area extracting signal D of a luminance signal Y and color difference signals R-Y and B-Y is extracted and supplied to an encoder circuit 3 to generate a color video signal E.

In addition, execution and non-execution of extraction is selected at a switching circuit 5 by a control signal from an input terminal 26, letting through a luminance signal Y and color difference signals R-Y and B-Y as they are in the case of non-execution. Execution and non-execution of characteristics control is also selected through an area extracting signal D at a frequency characteristics control circuit 23 according to a control signal from input terminals 27, 28 and 29. At a memory 9, random set-up of default values can be done from outside via an input terminal 30.

Thus, frequency characteristics, brightness and gain of an image can be compensated for a specific object in this embodiment.

Although an image of a specific object was distinguished from an image screen in the foregoing embodiments, they are not limited to specific objects and can be applied to specific images in general or can be used to distinguish images other than specific objects and images in the foregoing through a similar means. By controlling a switching circuit 5 according to this result of distinction, unnecessary images are removed and an image of a specific object is extracted.

As explained in the foregoing, a desired specific image can be extracted almost in realtime from an image screen according to the present invention, guaranteeing an image extraction of a specific object by following the movement or change in size of a specific object.

In addition, a specific image that has been extracted can be put over another image, while frequency characteristics, brightness and gain of an image can be compensated for this specific object.

What is claimed is:

1. A method for extracting a desired specific image within an image comprising the steps of:

designating a prescribed area within the image as an initial extracting area and storing an area extracting signal which is obtained through said designation;

extracting an area which fulfills conditions determined from an image signal of the image according to characteristics of the specific image as a candidate area and converting it into a candidate area signal;

generating a comparative area signal presenting an area slightly larger than the extracted area, which is necessary for expanding the extracted area, from the area extracting signal of the stored initial extracting area;

comparing said comparative area signal that has been generated with the candidate area signal and converting the candidate area signal in said comparative area signal into a new area extracting signal;

rewriting the area extracting signal in the initial extracting area by using the new area extracting signal; and performing either the extraction or removal of the image signal inside the area which is determined by the new area extraction signal.

2. A method according to claim 1 wherein the specific image is an image of a human or a human head.

3. A method for extracting a specific image according to claim 1 wherein designation of the initial extracting area is performed by reading out a prescribed area which has been stored in a memory in advance.

4. A method for extracting a specific image according to claim 1 wherein the image signal is a video signal obtained by imaging.

5. A method for extracting a specific image according to claim 1 wherein the extracted specific image is an image of a specific object.

6. A method according to claim 1 wherein the initial extracting area is a small area near the center of the foregoing image.

7. A method according to claim 1 wherein the initial extracting area can be set at will.

8. A method according to claim 1 wherein the area which is inside the candidate area but is not converted into the new area extracting signal is determined to be the candidate area.

9. A method according to claim 1 wherein frequency characteristics of the portion of the image signal which is extracted by the new area extracting signal can be compensated.

10. A method according to claim 1 wherein the level and gain of the portion of the image signal which is extracted by the new area extracting signal can be compensated.

11. A method for extracting a desired specific image within an image comprising the steps of writing the image signal obtained through imaging into an image memory;

designating a prescribed area within the image as an initial extracting area and storing the area extracting signal which is obtained through the designation;

extracting an area which fulfills the conditions determined from the image signal of the image according to the characteristics of the specific image as a candidate area and converting it into a candidate area signal;

generating a comparative area signal presenting an area sightly larger than the extracted area, which is necessary for expanding the extracted area, from the area extracting signal of the stored initial extracting area;

comparing the comparative area signal that has been generated with the candidate area signal and converting the candidate area signal in said comparative area signal into a new area extracting signal;

rewriting the area extracting signal in the initial extracting area by using the new area extracting signal; and performing either the extraction or removal of the image signal inside the area which is determined by the new area extraction signal.

12. A method according to claim 11 wherein the specific image is positioned at a fixed position of the screen through the image which is read out from the image memory.

13. An extracting system for a desired specific image within an image comprising:

means for designating a prescribed area within the image as an initial extracting area and memorizing the area extracting signal which is obtained through said designation;

means for extracting an area which fulfills the conditions determined from the image signal of the image according to the characteristics of the specific image as a candidate area and converting it into a candidate area signal;

means for generating a comparative area signal presenting an area slightly larger than the extracted area, which is necessary for expanding the extracted area, from the area extracting signal of the stored initial extracting area;

means for comparing said comparative area signal that has been generated with the candidate area signal and converting said candidate area signal in said comparative area signal into a new area extracting signal;

means for rewriting the area extracting signal in the initial extracting area by using the new area extracting signal;

means for performing either the extraction or removal of the image signal inside the area which is determined by the new area extracting signal.

14. An extracting system for a desired specific image within an image comprising: through imaging means for designating a prescribed area within the image as an initial extracting area and memorizing the area extracting signal which is obtained through said designation;

means for extracting an area which fulfills the conditions determined from the image signal of the image according to the characteristics of the specific image as a candidate area and converting it into a candidate area signal;

means for generating a comparative area signal presenting an area slightly larger than the extracted area, which is necessary for expanding the extracted area, from the area extracting signal of the stored initial extracting area;

means for comparing said comparative area signal that has been generated with the candidate area signal and converting said candidate area signal in said comparative area signal into a new area extracting signal;

means for rewriting the area extracting signal in the initial extracting area by using the new area extracting signal; and means for performing either the extraction or removal of the image signal inside the area which is determined by the new area extraction signal.

15. A video camera for providing a video signal of an image picked up by an image pickup device and processed in a signal processing circuit comprising:
   extraction means for extracting a signal representative of a specific portion of a target object in a video signal provided as an output from the signal processing circuit; and
   control means responsive to the signal extracted by the extraction means for effecting control of an image of the target object by controlling at least one operation of the video camera by modify at least one of frequency characteristics, color, brightness, gain and size of the target object in accordance with the extracted signal.

16. A video camera for providing a video signal of an image picked up by an image pickup device and processed in a signal processing circuit comprising:
   extraction means for extracting a signal representative of a specific portion of a target object in a video signal provided as an output from the signal processing circuit; and
   control means responsive to the signal extracted by the extraction means for effecting control of the at least one operation of the video camera in accordance with the extracted signal, wherein the control means is responsive to the signal extracted by the extraction means for effecting control of at least one operation of the video camera other than a focus control and stabilization control of the target object in accordance with the extracted signal.

17. A video camera for providing a video signal of an image picked up by an image pickup device and processed in a signal processing circuit comprising:
   extraction means for extracting a signal representative of a specific portion of a target object in a video signal provided as an output from the signal processing circuit; and
   control means responsive to the signal extracted by the extraction means for effecting control of the at least one operation of the video camera in accordance with the extracted signal;
   wherein the extractio means extracts the signal representative of the specific portion of the target object of the video signal provided as the output from the signal processing circuit based upon a feature of the specific portion, other than a focus condition and a stabilization condition thereof.

18. A video camera according to claim 17, wherein the feature of the specific portion other than the focus condition and the stabilization condition includes a shape of the specific portion.

19. A video camera for providing a video signal of an image picked up by an image pickup device and processed in a signal processing circuit comprising:
   extraction means for extracting a signal representative of a specific portion of a target object in a video signal provided as an output from the signal processing circuit; and
   control means responsive to the signal extracted by the extraction means for effecting control of at least one operation of the video camera in accordance with the extracted signal, wherein the control means is responsive to the signal extracted by the extraction means for effecting control of the at least one operation of the video camera in addition to at least one of a focus control and a stabilization control of the target object in accordance with the extracted signal.

* * * * *